United States Patent [19]

Beusterien et al.

[11] Patent Number: 4,991,870

[45] Date of Patent: Feb. 12, 1991

[54] METHOD AND ARRANGEMENT FOR FORMING AN AIR BAG DEPLOYMENT OPENING IN AN AUTO INTERIOR TRIM PIECE

[75] Inventors: Julie A. Beusterien, Farmington Hills; Richard E. Powell, Pleasant Ridge, both of Mich.

[73] Assignee: Tip Engineering Group, Inc., Farmington Hills, Mich.

[21] Appl. No.: 399,026

[22] Filed: Aug. 28, 1989

[51] Int. Cl.⁵ ............................................. B60R 21/16
[52] U.S. Cl. ..................................... 280/732; 280/743
[58] Field of Search ................ 280/728, 731, 732, 743

[56] References Cited

FOREIGN PATENT DOCUMENTS 3545028  7/1987  Fed. Rep. of Germany ...... 280/743
122754  5/1989  Japan ................................. 280/743

Primary Examiner—Kenneth R. Rice
Attorney, Agent, or Firm—John R. Benefiel

[57] ABSTRACT

A method and arrangement is disclosed for providing one or more air bag deployment doors in which an explosive containing coating is deposited on the inside of an auto interior trim piece in the pattern of the doors immediately over the air bag receptacle in which the air bag is stored. The coating is comprised of a suspension of explosive material in a carrier which is detonated when the system is activated and the door or doors so formed are pushed open by the inflating air bag.

4 Claims, 1 Drawing Sheet

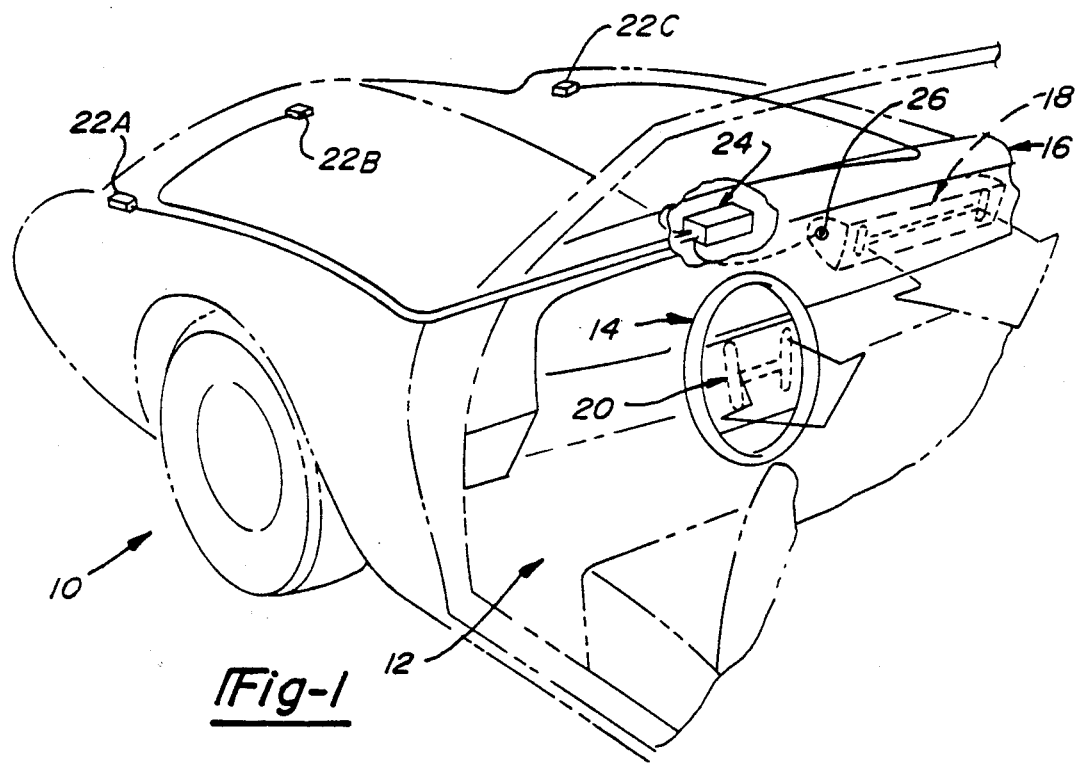
*Fig-1*
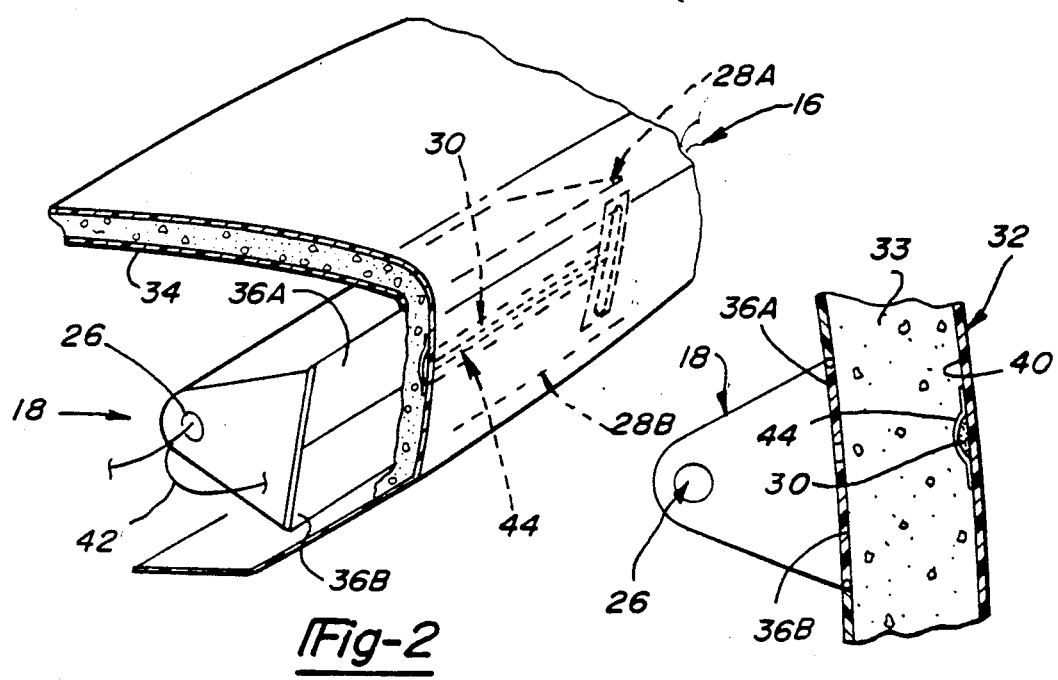
*Fig-2*   *Fig-3*
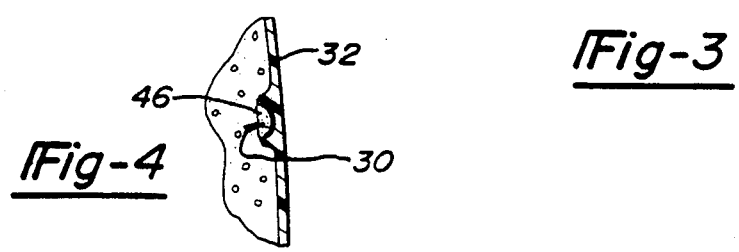
*Fig-4*

METHOD AND ARRANGEMENT FOR FORMING AN AIR BAG DEPLOYMENT OPENING IN AN AUTO INTERIOR TRIM PIECE

This invention concerns so-called "air bag" systems in which an inflatable cushion is stored within a compartment or receptacle within the auto or truck vehicle passenger compartment behind an interior trim piece. When a sensor system detects the onset of a serious crash, the system is triggered, causing gas generators to be activated and the cushion, commonly called an "air bag", to be inflated. When inflated, each air bag deploys into the proper position within the passenger compartment to protect the passenger or driver against impact with the interior structure of the vehicle.

The air bag is stored behind an interior trim piece such as the steering wheel cover or a section of the instrument panel, and deploys through an opening provided at the instant of system activation, typically involving a hinged door pushed open by the inflating air bag.

Providing such an opening is a difficult design problem since the air bag must be securely protected against tampering, yet very reliably operate to allow the air bag to deploy within a few milliseconds after the system is activated.

The associated trim pieces should not suggest the presence of the stored air bag, since this indication of its presence makes some individuals uneasy, and invites tampering by others. Contrariwise, typical arrangements heretofore employed have delineated or at least suggested the presence of the air bag.

Such arrangements proposed in the past have also often involved extra components and complex assemblies of trim parts such as the instrument panel, increasing costs substantially and reducing reliability.

SUMMARY OF THE INVENTION

The present invention provides an arrangement and method for forming an air bag deployment opening in an auto trim piece, such as the instrument panel, steering wheel, or door trim cover, which does not suggest the presence of the stored bag, nor require a complex assembly of separate doors, retainers, etc. This arrangement and method comprise the coating of an inner surface of a trim piece with a material containing an explosive. The coating is in a pattern forming one or more deployment doors; when the explosive is activated it degrades the trim piece to enable the air bag to push the door or doors open and to deploy through the resulting opening.

The explosive material is preferably activated by a detonation method which is associated with the gas generator included in the air bag module, so that the opening is created at the same instant as the system operation is initiated.

The explosive material comprises a non-reactive, neutral carrier in which a suitable high velocity explosive is dispersed, so that upon curing, a durable coating containing (integrally) an explosive, is adhered to the trim piece inner surface in a predetermined configuration.

Suitable high propagation rate explosives include PETN or HMX; suitable carriers could be non oil based paint carriers such as acrylic resins or latex types.

DESCRIPTION OF THE DRAWINGS

FIG. 1 is a sectioned perspective view of the front of an automobile illustrating an air bag system and its components therein.

FIG. 2 is an enlarged, sectional view of a passenger side air bag installation located behind the instrument panel, showing the arrangement of a deployment door according to the present invention.

FIG. 3 is a side elevational enlarged sectional view of the passenger side components shown in FIG. 2.

FIG. 4 is an enlarged sectional view of the instrument panel skin with an alternate form of the arrangement according to the present invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIG. 1, the forward end of auto vehicle body 10 is shown which defines a passenger compartment 12 within which the driver and front seat passengers are seated.

The current air bag systems provide a driver's side air bag in the steering wheel 14 and a larger passenger side air bag in the right side section of the instrument panel 16.

The air bag systems are currently designed with each air bag folded and stored in a receptacle 18 (passenger side only shown in FIG. 1) mounted behind an interior trim piece such as the right side section of the instrument panel 16 or the steering wheel cover 20 fit within the steering wheel 14.

A series of crash sensors 22A, 22B, and 22C transmit an electronic signal to a diagnostic module 24 on the detection of an impact event, i.e. a crash. This module in turn sends an activation signal to an ignitor assembly 26 associated with a gas generator contained within an airbag module (not shown) used to rapidly produce a large volume of gas to inflate folded the air bag (not shown). Since such air bag systems are well known, and the application of the present invention is not limited to any particular air bag system design, the particulars of these systems is not here set out.

When inflated, the air bag is deployed into the passenger compartment 12 through one or more outer doors 28A and 28B formed into the trim piece behind which the air bag receptacle 18 is stored.

According to the concept of the present invention, the trim piece, as illustrated in FIUGRE 2 by a section of the instrument panel 16, is initially formed without separate outer doors 28A and 28B, but rather the doors 28A and 28B, are formed at the moment of initiation of the air bag system, broken apart by the protruding substrate pieces underneath, described hereinafter.

This is accomplished by detonation of a coating layer 30 containing an explosive so as to result in partial or complete degradation of the outer layer of skin 32 of the instrument panel section 16. The coating layer 30 is deposited in a pattern so as to form three sides of each door 28A and 28B, the remaining side acting as a hinge allowing the opening movement of the door while keeping the door attached to the instrument panel 16.

At best seen in FIG. 3, the instrument panel 16 is shown constructed of three layers, the outer skin layer 32 (typically of a tough plastic such as vinyl), a central core 33 of a soft foam, and a relatively stiff inner supporting or substrate layer 34 of a tougher harder material as of metal or plastic.

The inner layer 34 may be formed with a cutout area configured to receive the receptacle 18; this layer provides back up to the foam core 33 and skin 32 in that region. The receptacle 18 in that design is itself equipped with substrate pieces comprised of rigid doors 36A and 36B, which fit in the cut out area of the substrate layer 34, and are hinged to open when the air bag is inflated.

Alternatively, the inner doors 36A and 36B may be separate panels, attached to the inner layer 34 so as to be hinged open.

Upon severing of the outer skin 32 in the door pattern 28A, 28B, the unsevered thickness of the core 33, being soft, is easily sheared to enable the inner doors 36A and 36B to open.

The coating layer 30 is preferably deposited on the inside surface 40 of the skin layer 32 by process adapted to production, such a silkscreening, painting, rolling, etc. For this purpose, a curable liquid or paste mixture is formulated, containing a high velocity explosive, such a s PETN or HMX in a form able to be dispersed in a non-reactive, neutral carrier liquid, such as those used in conventional non-oil based paints.

As an example, a mixture 85% by weight of powder or flakes of explosive and 15% of an acrylic resin or latex carrier may be employed.

The explosive in the coating layer 30 is detonated preferably in parallel with the ignitor assembly so that when the gas generator is activated formation of the deployment doors 28A, B, is simultaneously initiated.

A reflective tape 44 may be advantageously used to cover and protect the coating 30, as well as to direct the explosive therein.

As one alternative shown in FIG. 4, a groove 46 may be formed on the inside 40 of the skin 32, and an explosive paste deposited, as by wiping therein.

The above described method and arrangement may be employed in any air bag installation, i.e., with the steering wheel cover, single door top mount, or a double door mid mount instrument panel, by using a coating layer containing an explosive with the specific trim piece involved.

Similarly, the method and arrangement may be employed with other air bag system designs.

The explosives mentioned are widely used in detonating cord and have extremely high velocities of propagation so that the doors are formed extremely rapidly, so as to not hinder deployment of the air bag. Very low weights of explosive are adequate, i.e., less than 5 grams per foot of explosive is adequate when using PETN.

We claim:

1. In an vehicle having a passenger compartment equipped with an inflatable air bag system including an air bag receptacle mounted behind an interior trim piece, an arrangement for providing one or more deployment doors for enabling deployment of said air bag into said passenger compartment characterized by a coating comprised of a carrier containing particles of an explosive material suspended therein, said coating deposited on an inner surface of said trim piece in a pattern forming said one or more doors and means for detonating said explosive upon activation of said air bag system to initiate formation of said one or more doors.

2. The arrangement according to claim 1 wherein said coating carrier comprises an inert and non-reactive material, said carrier cured to form said coating.

3. The arrangement according to claim 2 wherein said coating comprises high velocity PETN or HMX suspended in said carrier, said carrier comprised of acrylic resin or latax.

4. A method of forming one or more air bag deployment doors in an automotive vehicle interior trim piece comprising the steps of:
coating an inner surface of said trim piece in a pattern forming said one or more doors with a material comprising a carrier containing particles of an explosive dispersed therein;
curing said carrier to form a durable deposit on said inner surface; and
detonating said explosive upon activation of said air bag system.

* * * * *

UNITED STATES PATENT AND TRADEMARK OFFICE
CERTIFICATE OF CORRECTION

PATENT NO. : 4,991,870
DATED : February 12, 1991
INVENTOR(S) : Beusterien et al

It is certified that error appears in the above-identified patent and that said Letters Patent is hereby corrected as shown below:

Column 1, line 58, "as" should be --that--.

Column 2, line 45, "folded the" should be --the folded--.

Column 2, line 49, "is" should be --are--.

Column 2, line 55, "FIUGRE 2" should be --FIGURE 2--.

Column 3, line 6, "as" should be --, such as--.

Column 3, line 23, "by" should be --by a--.

Column 3, line 5, "tougher" should be -- tougher, --.

Signed and Sealed this

Eighteenth Day of August, 1992

Attest:

DOUGLAS B. COMER

*Attesting Officer*    *Acting Commissioner of Patents and Trademarks*